US011427348B2

United States Patent
Desclaux-Chevalier et al.

(10) Patent No.: US 11,427,348 B2
(45) Date of Patent: Aug. 30, 2022

(54) METHOD AND DEVICE FOR OPTIMIZING TESTS OF SYSTEMS IN PARTICULAR OF AN AIRCRAFT

(71) Applicant: Airbus Operations (S.A.S.), Toulouse (FR)

(72) Inventors: Anne-laure Desclaux-Chevalier, Colomiers (FR); Serge Passemar, Castelnaudary (FR); Christelle Senegas, Fontenilles (FR); Jean-Christophe Rey, Toulouse (FR); Emmanuelle Escorihuela, Brax (FR); Christophe Bressy, Aussonne (FR)

(73) Assignee: Airbus Operations (S.A.S.), Toulouse (FR)

( * ) Notice: Subject to any disclaimer, the term of this patent is extended or adjusted under 35 U.S.C. 154(b) by 390 days.

(21) Appl. No.: 16/708,794

(22) Filed: Dec. 10, 2019

(65) Prior Publication Data

US 2020/0189763 A1 Jun. 18, 2020

(30) Foreign Application Priority Data

Dec. 12, 2018 (FR) ...................................... 1872782

(51) Int. Cl.
*B64D 45/00* (2006.01)
*B64F 5/60* (2017.01)
*G06F 16/245* (2019.01)

(52) U.S. Cl.
CPC ................ *B64D 45/00* (2013.01); *B64F 5/60* (2017.01); *G06F 16/245* (2019.01); *B64D 2045/0085* (2013.01)

(58) Field of Classification Search
CPC ... B64D 45/00; B64D 2045/0085; B64F 5/60; B64F 5/40; G06F 16/245; G06F 11/3688;
(Continued)

(56) References Cited

U.S. PATENT DOCUMENTS 5,036,479 A * 7/1991 Prednis .................. G01D 18/00
714/732
2006/0069521 A1 * 3/2006 Meyer ................... G01M 7/025
702/42
(Continued)

FOREIGN PATENT DOCUMENTS

EP 1868146 A1 * 12/2007 ............. G06N 7/005
EP 2 266 880 A1 12/2010
(Continued)

OTHER PUBLICATIONS

French Search Report for Application No. 1872782 dated Aug. 7, 2019.

*Primary Examiner* — Mary Cheung
(74) *Attorney, Agent, or Firm* — Jenkins, Wilson, Taylor & Hunt, PA

(57) ABSTRACT

A method and device for optimizing tests of systems, in particular of an aircraft, including a first display module displaying a list of tests that can be executed by systems, a selection module allowing an operator to select a set of tests to be executed and communicate it to an optimization module which determines a sequence of tests representing an optimized execution of the set of tests to be executed, the sequence of tests being displayed by a second display module for an operator, a decision module generating either a first signal if the operator validates the sequence of tests, or a second signal if the operator cancels the sequence of tests, and a control module which, if the first signal is generated, commands the execution of the sequence of tests by each of the systems, and generates results of the execution thereof.

20 Claims, 2 Drawing Sheets

(58) Field of Classification Search
CPC .... G06F 11/3684; G06Q 50/30; G06Q 10/20; G07C 5/0825; G07C 2205/02
See application file for complete search history.

(56) References Cited

U.S. PATENT DOCUMENTS

2009/0187449 A1    7/2009  van Tulder et al.
2010/0010702 A1*   1/2010  Gilbert .................... G06N 5/04
                                                      701/31.4
2013/0138467 A1    5/2013  Small et al.

FOREIGN PATENT DOCUMENTS

WO     WO 2019/071344 A1      4/2019
WO     WO-2019071344 A1 *     4/2019   ............ B64D 43/00

* cited by examiner

METHOD AND DEVICE FOR OPTIMIZING TESTS OF SYSTEMS IN PARTICULAR OF AN AIRCRAFT

CROSS-REFERENCE TO RELATED APPLICATION

This application claims priority to French patent application 18 72782 filed Dec. 12, 2018, the entire disclosure of which is incorporated by reference herein.

TECHNICAL FIELD

The disclosure herein relates to a method and a device for optimizing tests of systems, in particular of an aircraft.

BACKGROUND

Normally, during operations for the manufacture or maintenance of an aircraft, in particular a transport plane, the systems of the aircraft are tested in order to ensure that they operate correctly before the delivery of the aircraft.

There are known solutions for carrying out these tests such as a device located on the ground and connected to the system of the aircraft which is to be tested. The device and the system are connected by testing equipment specific to the system. The specific equipment allows the device and the system to exchange data that is used to carry out the tests.

Setting up the testing of a system requires the installation, in advance, of the testing equipment specific to this system, for example the connection of a network of cables. Some systems cannot be tested directly and require the installation of specific equipment called a "false system", for example the replacement of the system by test boxes. The testing of such a system is then carried out through the false system.

The test procedure for the system is determined by the device. The test procedure is displayed on a screen in the cockpit. An operator, located in the cockpit carries out the test procedure by sequencing various operations, which can be manual (pressing on buttons, executing tests using the maintenance system, etc.) or automatic.

Executing some tests can require several operators, for example an operator who presses on buttons in the cockpit and another operator who is located in front of the mechanical element to be tested. The test data is received and checked by the operator in the cockpit without being recorded.

Such solutions therefore require the installation of specific equipment by operators for each system to be tested. Moreover, the successive execution of the tests is determined statically. The tests that can be carried out in an optimized manner, for example by executing some tests in parallel, are dependent upon the number of operators available to carry out these tests and the space available in the cockpit.

This type of normal solution is therefore costly in terms of time and human and logistical resources. Therefore, this type of solution is not completely satisfactory.

SUMMARY

An aim of the disclosure herein is to overcome this disadvantage.

For this purpose, it relates to a device for optimizing tests of systems, in particular of an aircraft.

According to the disclosure herein, the method comprises:
a first display step, implemented by a first display module, consisting in or comprising displaying, for an operator, a list of tests that can be executed by at least one of the systems, each of the executable tests being associated with executing conditions;
a selection step, implemented by a selection module, consisting in or comprising selecting and communicating, from the list of executable tests, a set of tests to be executed, the set of tests to be executed comprising at least one executable test;
an optimization step, implemented by an optimization module, consisting in or comprising determining and communicating, depending on the executing conditions, a sequence of tests that represents an optimized execution of the set of tests to be executed, the sequence of tests comprising a plurality of series of tests that are able to be executed in parallel, each of the series of tests comprising at least one test from the set of tests to be executed;
a second display step, implemented by a second display module, consisting in or comprising displaying, to the operator, the sequence of tests;
a decision step, implemented by a decision module, consisting in or comprising generating a signal corresponding either to a first signal representing a decision of an operator to validate the sequence of tests, or a second signal representing a decision of the operator to cancel the sequence of tests;
if the signal generated by the decision module corresponds to the first signal, the method comprises, moreover, at least one command step, implemented by a control module, consisting in or comprising commanding the execution of the sequence of tests by systems, and in generating results of the execution of the tests of the sequence of tests by each of the systems.

Thus, thanks to the disclosure herein, the optimization of the set of tests into a sequence of tests and then the execution of this sequence of tests does not require the installation in the aircraft nor the monitoring of equipment dedicated to each system. Furthermore, when the sequence of tests is validated, the presence of one or more operators is not necessary. The set of tests, which are chosen by an operator, is therefore optimized such as to minimize the time, the gear and the number of operators necessary.

Advantageously, the method also comprises the succession of following steps, which is implemented before the first display step:
an identification step, implemented by an identification module, consisting in or comprising communicating to a general database information for identifying a set of specific systems, the identification information being provided by the operator; and
a preselection step, implemented by a preselection module, consisting in or comprising preselecting, from a plurality of test databases, that is contained in the general database, a test database associated with the identification information communicated by the identification module, the preselected test database comprising a list of tests that can be executed by at least one of the systems.

Moreover, advantageously, the method also comprises a first adjustment step, implemented by a first adjustment module, the first adjustment step comprising the succession of following steps, which is implemented before the optimization step:
an acquisition sub-step, implemented by an acquisition element, consisting in or comprising acquiring operating information of the systems during previous uses;

if the operating information comprises error information, relating to operating errors of the systems preventing the execution of at least one part of the set of tests to be executed, the succession of steps moreover comprises:
  a determination sub-step, implemented by a determination element, consisting in or comprising determining at least one replacement test from the tests to be executed of the list of tests to be executed and in communicating the at least one replacement test;
  a display sub-step, implemented by the first display module, consisting in or comprising displaying, to the operator, the at least one replacement test; and
  a decision sub-step, implemented by a decision element, consisting, for the operator, either in validating the at least one replacement test in the set of tests, or in cancelling the at least one replacement test in the set of tests and in communicating to the selection module either information for validating the set of tests comprising the at least one replacement test, or information for cancelling the at least one replacement test, respectively.

Furthermore, preferably, the selection step also consists in or comprises:
  replacing the at least one part of the set of tests to be executed which cannot be executed with the at least one replacement test in the set of tests to be executed when validation information is received; or
  removing the at least one part of the set of tests to be executed which cannot be executed, when cancellation information is received.

Advantageously, the method also comprises the succession of following steps, which is implemented after the command step:
  a third display step, implemented by a third display module, consisting in or comprising displaying at least some of the results of the execution of the tests; and
  a recording step, implemented by a recording module, consisting in or comprising recording the results of the execution of the tests, transmitted by the control module, in a database of results.

Furthermore, preferentially, the method also comprises, if a result of the execution of a test prevents the execution of the remainder of the sequence of tests representing a particular situation, the succession of following steps:
  an alert step, implemented by an alert element, consisting in or comprising commanding the stoppage of the execution of the sequence of tests by each of the systems and transmitting alert information; and
  a second adjustment step, implemented by a second adjustment module, consisting in or comprising determining a new sequence of tests according to the execution conditions and alert information received from the alert element.

The disclosure herein relates, furthermore, to a device for optimizing tests of systems, in particular of an aircraft.

According to the disclosure herein, the device includes:
  a test database containing a list of executable tests;
  a first display module, configured to display, for an operator, a list of tests that can be executed by at least one of the systems, each of the executable tests being associated with execution conditions;
  a selection module, configured to select and to communicate, from the list of executable tests, a set of tests to be executed, the set of tests to be executed comprising at least one executable test;
  an optimization module, configured to determine and to communicate, depending on the execution conditions, a sequence of tests that represents an optimized execution of the set of tests to be executed, the sequence of tests comprising a plurality of series of tests that can be executed in parallel, each of the series of tests comprising at least one test from the set of tests to be executed;
  a second display module, configured to display, for the operator, the sequence of tests;
  a decision module, configured to generate a signal corresponding either to a first signal representing a decision of an operator to validate the sequence of tests, or a second signal representing a decision of the operator to cancel the sequence of tests; and
  a control module, configured, if the signal generated by the decision module corresponds to the first signal, to command the execution of the sequence of tests by each of the systems that are associated therewith, and to generate results of the execution of the tests of the sequence of tests by each of the systems.

Advantageously, the device also includes:
  a general database containing a plurality of test databases;
  an identification module configured to communicate to the general database information for identifying a specific set of systems, the identification information being provided by the operator; and
  a preselection module configured to preselect, from the plurality of test databases that is contained in the general database, a test database associated with the identification information communicated by the identification module, the preselected test database comprising a list of tests that can be executed by at least one of the systems.

Moreover, preferably, the device includes a first adjustment module, the first adjustment module comprising:
  an acquisition element, configured to acquire operating information of the systems during previous uses;
  a determination element, configured, if the operating information comprises error information, relating to operating errors of the systems preventing the execution of at least one part of the set of tests to be executed, to determine at least one replacement test from the tests to be executed of the list of tests to be executed and to communicate the at least one replacement test;
  the first display module, configured to display, to the operator, the at least one replacement test; and
  a decision element, configured to allow the operator either to validate the at least one replacement test in the set of tests, or to cancel the at least one replacement test in the set of tests, the decision element being also configured to communicate to the selection module either information for validating the set of tests comprising the at least one replacement test, or information for cancelling the at least one replacement test, respectively.

Advantageously, in a specific embodiment, the selection module is also configured to:
  replace the at least one part of the set of tests to be executed which cannot be executed with the at least one replacement test in the set of tests to be executed when validation information is received; or
  remove the at least one part of the set of tests to be executed which cannot be executed, when cancellation information is received.

Moreover, advantageously, the device also includes a recording module configured to record the results of the execution of the tests, transmitted by the control module, in a database of results.

Furthermore, preferentially, the control module includes, if a result of the execution of a test prevents the execution of the remainder of the sequence of tests representing a particular situation, an alert element, configured to command the stoppage of the execution of the sequence of tests by each of the systems and to transmit alert information representing a particular situation.

Moreover, in a specific embodiment, the optimization module includes, in the case of receipt of alert information transmitted by the control module, a second adjustment module configured to determine a new sequence of tests depending on the execution conditions and the alert information received from the control module.

The disclosure herein relates, furthermore, to an aircraft, in particular a transport plane, comprising a device for optimizing tests of systems, like that described above.

BRIEF DESCRIPTION OF THE DRAWINGS

The appended, example figures will clearly explain how the disclosure herein can be achieved. In these figures, identical references refer to similar elements.

DETAILED DESCRIPTION

Figure 1:
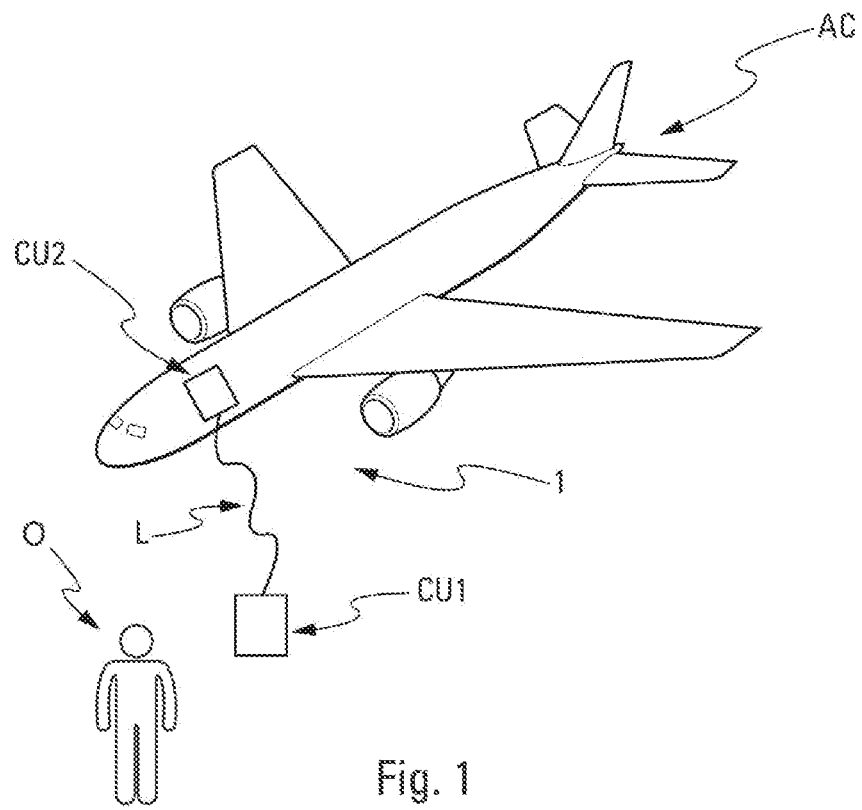
FIG. 1 represents an aircraft containing an onboard device for optimizing tests of systems.
Figure 2:
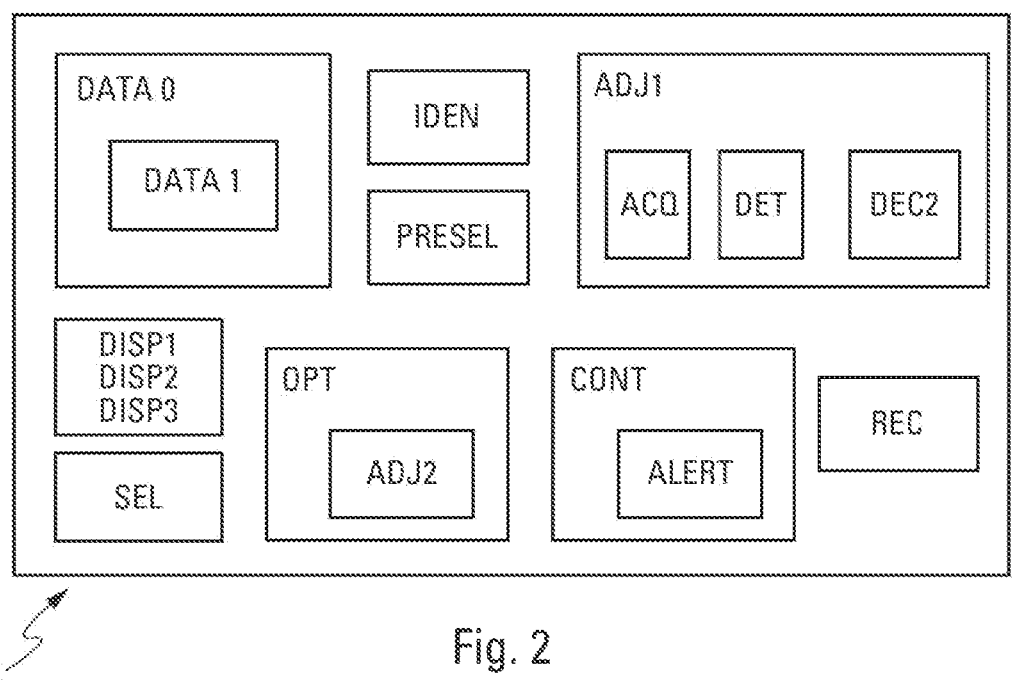
FIG. 2 is a synoptic diagram of a specific embodiment of a device for optimizing tests of systems.

The optimization device 1, schematically represented in a specific embodiment in FIG. 2, is intended to optimize the execution of a set of tests that has been chosen beforehand in operations for initial configuration or reconfiguration of systems of the aircraft AC (FIG. 1), in particular of a transport plane.

In the context of the disclosure herein, set of tests means a plurality of checks of the operation of one or more systems during maintenance operations for the aircraft AC or during the manufacture of the aircraft AC. These operational checks are necessary for a configuration or a reconfiguration of the systems or of part of the systems of the aircraft AC.

Within the context of the disclosure herein, the systems can be any type of on-board system, notably the pressurization system of the aircraft AC, the system for opening or retracting the landing gear, the system for cooling a motor, etc.

As represented in FIG. 2, the device 1 comprises an identification module IDEN. This identification module IDEN communicates identification information provided by an operator O, to a general database DATA0. The identification module IDEN includes, for example, a touchscreen by which the operator O provides the identification information. For example, the series number of an aircraft AC is identification information.

Moreover, the device 1 includes the general database DATA0 which contains a plurality of test databases DATA1. Each of the test databases DATA1 is associated with one or more items of identification information.

The device 1 includes, furthermore, a preselection module PRESEL which preselects, from the plurality of test databases DATA1, the test database DATA1 associated with the identification information communicated by the identification module IDEN.

In a preferred embodiment, the device 1 includes a display module DISP1, for example a screen of a tablet or any other mobile element. The display module DISP1 is configured to display the list of tests that can be executed by at least one of the systems. The list of executable tests is contained in the test database DATA1 preselected by the preselection module PRESEL. The list of executable tests is therefore suited to the aircraft AC identified by the identification information communicated by the identification module IDEN. The list of executable tests includes all of the tests that can be executed on this aircraft AC. Each of the executable tests is associated with conditions necessary for the execution thereof by one or more systems called execution conditions.

There are two types of execution conditions. The execution conditions of a first type are a set of prerequisites that are essential for a test to be executable. By way of example, test prerequisites are:
  certain energy sources which must be available;
  the validation of safety conditions around the aircraft AC;
  certain systems which must be live; and
  certain tests which must be carried out in advance.

The execution conditions of a second type are one or more attributes indicating which tests can be executed simultaneously with the test with which these attributes are associated. By way of example, a pressure test for the tyres and a pressurization test for the cabin can be executed simultaneously.

As represented in FIG. 2, the device 1 also includes a selection module SEL allowing the operator O to select, from the list of executable tests that is displayed by the display module DISP1, a set of tests to be executed. This set of tests to be executed comprises at least one executable test present in the list of executable tests. The selection module SEL communicates the set of tests to be executed.

In a preferred embodiment, as represented in FIG. 2, the device 1 also includes an adjustment module ADJ1 which adjusts the set of tests to be executed communicated by the selection module SEL according to operating information received by the systems of the aircraft AC.

The adjustment module ADJ1 includes:
  an acquisition element ACQ which is configured to acquire the operating information of the systems during previous uses. The operating information is recorded in dedicated memories of each of the systems of the aircraft. The acquisition element ACQ has access to these memories. The operating information relates, for example, to the configuration of these systems or to detected failures. When some of the detected failures can prevent the execution of some or of all of the set of tests to be executed, the operating information comprises error information relating to these failures;
  a determination element DET which determines at least one replacement test in the list of tests to be executed, when error information is present. Choosing one or more replacement tests takes into account the error information received from the systems of the aircraft AC. The determination element DET is also configured to communicate the replacement test or tests chosen from the list of executable tests;
  the display module DISP1 which displays, to the operator O, the replacement test or tests determined by the determination element DET; and
  a decision element DEC2 which is configured to allow the operator O either to validate the replacement test or tests, or to cancel the replacement test or tests. The decision element DEC2 communicates, to the selection module SEL, either information for validating the set of tests VT comprising the replacement test or tests, or information for cancelling the replacement test or tests AT, respectively.

The selection module SEL is also configured to:
replace the test or tests which cannot be executed with the replacement test or tests in the set of tests to be executed, when validation information VT is received; or
remove the test or tests to be executed which cannot be executed, when cancellation information AT is received.

In a preferred embodiment, the display module DISP1, the decision element DEC2 and the selection module SEL are arranged in one and the same interface unit at the disposal of the operator O. This interface unit is mobile. By way of example, this mobile interface unit is a tablet comprising a touchscreen.

In a preferred embodiment, the device 1 includes an optimization module OPT. This optimization module OPT receives the set of tests to be executed communicated by the selection module SEL and determines a sequence of tests according to the execution conditions associated with each one of the tests that is contained in the set of tests to be executed. The sequence of tests represents an optimized execution, in terms of time and human and technical resources, of the set of tests to be executed. The sequence of tests comprises a plurality of series of tests. Each of the series of tests is formed from at least one test of this set of tests to be executed. Series of tests means a sub-set of tests of the set of tests to be executed which are to be executed successively. If the execution conditions of the tests to be executed allow it, the series of tests are executed in parallel. Execution in parallel means the simultaneous execution of several series of tests. In this preferred embodiment, the optimization module OPT is arranged on the ground.

Moreover, the device 1 comprises a display device DISP2 which displays the sequence of tests that is communicated by the optimization module OPT. In a preferred embodiment, the display module DISP1 and the display module DISP2 are one and the same display module, as represented in FIG. 2. This display module is, for example, the screen of a mobile tablet. In a variant, the display module DISP1 and the display module DISP2 are different display modules.

As represented in FIG. 2, the device 1 includes, furthermore, a decision module DEC1 which generates a signal. This signal corresponds either to a signal VS representing a decision of the operator O to validate the displayed sequence of tests, or to a signal AS representing a decision of the operator O to cancel the displayed sequence of tests.

Furthermore, the device 1 includes a control module CONT, which, in the case of receipt of the signal VS generated by the decision module DEC1, commands the execution of the sequence of tests by the system or systems in question. The control module CONT is configured to be used as an interface between the optimization module OPT and the various systems of the aircraft AC. Using a sequence of tests, the control module CONT distributes orders to execute tests representing the sequence of tests. The control module CONT coordinates the executions thereof by the systems. The control module CONT is also configured to generate results representing the execution of the sequence of tests by the systems. In a preferred embodiment, the control module is arranged on board the aircraft AC. In a variant, the control module and the optimization module are arranged in a same central unit located on the ground.

In a specific embodiment, the control module CONT comprises an alert element ALERT. This alert element ALERT is configured to command the stoppage of the execution of the sequence of tests by the systems if one or more execution results are associated with a particular situation PS in which the remainder of the sequence of tests cannot be executed. The alert element ALERT transmits alert information relating to the particular situation PS.

In the context of the disclosure herein, remainder of the sequence of tests means the part of the sequence of tests which has not yet been executed by the systems.

Moreover, the optimization module OPT includes an adjustment module ADJ2 which, in the case of receipt of alert information transmitted by the alert element ALERT of the control module CONT, determines a new sequence of tests. This new sequence of tests is determined according to the remainder of the sequence of tests to be executed, the execution conditions for the tests to be executed in the remainder of the sequence of tests and the alert information. The adjustment module ADJ2 communicates a new sequence of tests to the control module CONT.

In a specific embodiment, the device 1 comprises a third display module DISP3 which displays, in real-time, at least some of the results of the execution of the sequence of tests generated by the control module CONT. Preferably, the display modules DISP1, DISP2 and the display module DISP3 are one and the same display module. By way of example, the display module DISP3 is a screen of a tablet.

In another embodiment, the device 1 includes a recording module REC which records the results generated by the control module CONT in a database of results. From the results of this database of results, it is possible allows to update the list of the executable tests of the test database DATA1.

In a specific embodiment, at least the test database DATA1, the optimization module OPT and the recording module REC are arranged in a same test central unit CU1 located on the ground. This test central unit CU1 converses with the control module CONT arranged in a central unit CU2 mounted on board the aircraft via a wireless communications link L, as is represented in FIG. 1. In a variant, the communication link L between the test central unit CU1 and the test central unit CU2 is of wired type.

Figure 3:
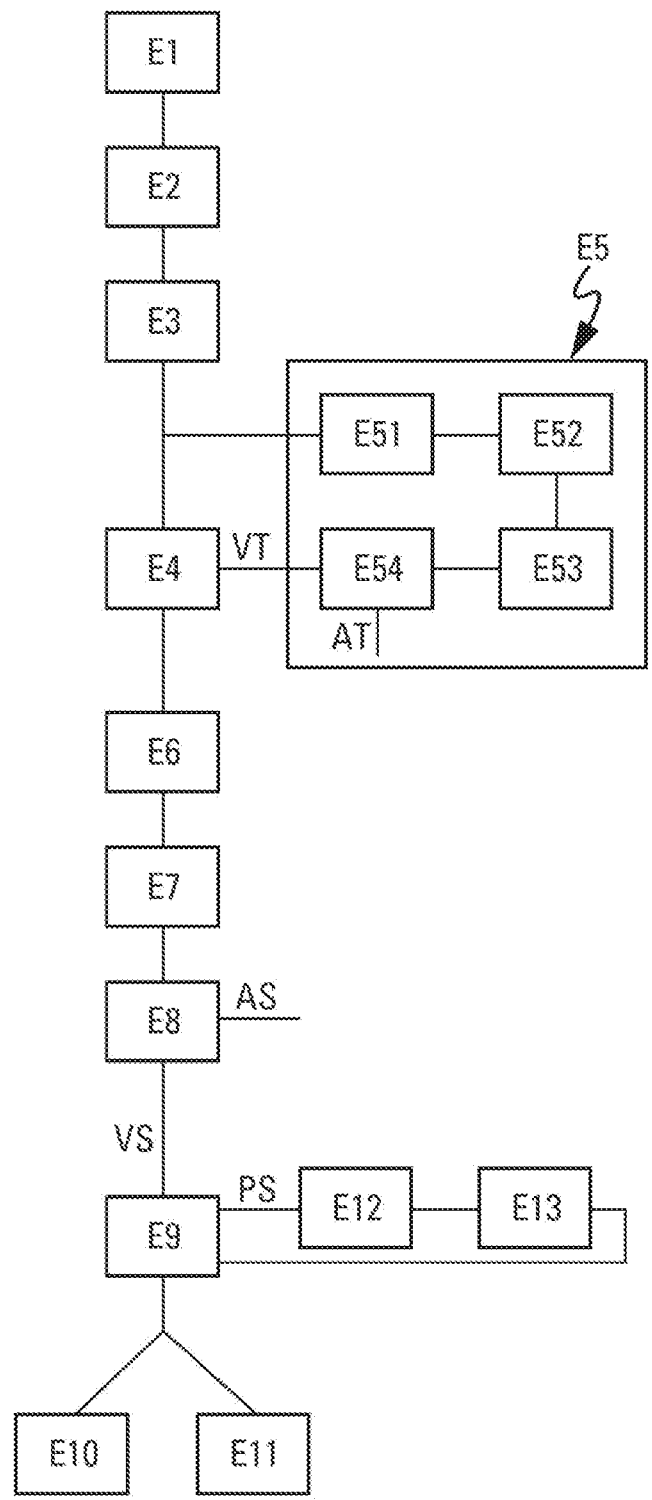
FIG. 3 is a synoptic diagram of a specific embodiment of a method for optimizing tests of systems.

The device 1, as described above, can implement a method for optimizing tests of systems of an aircraft AC. The method comprises several specific embodiments, as is represented in FIG. 3.

The method comprises an identification step E1 during which the operator O provides identification information, for example the serial number of an aircraft AC by which it is identified. The operator O provides this identification information, for example, by a tablet computer. A test database DATA1 that is associated with this identification information is preselected, during a preselection step E3, from the plurality of test databases DATA1 that is contained in the general database DATA0. The preselected test database DATA1 is suited to the identified aircraft. This test database DATA1 comprises a list of tests that can be executed by one or more systems of the identified aircraft, which list is displayed during a display step E3. Each of the executable tests is associated with execution conditions. These execution conditions relate to prerequisites, for example the advance powering of certain systems, and attributes specifying which other tests can be executed simultaneously.

During a selection operation E4, the operator selects, by the selection module SEL, from the list of executable tests, one or more tests. This selected test or tests form a set of tests to be executed.

In parallel with this selection, an adjustment step E5 which comprises at least one acquisition sub-step E51 is implemented. During this acquisition sub-step E51, the acquisition element ACQ retrieves operating information from each of the systems to be tested. This operating information is transmitted by each of these systems. Operating information can be linked to the configuration of a system and to the failures detected during previous uses.

By way of example, if, during a previous flight, the flight control position sensor detects a failure, the operating information relating to this failure is recorded in a memory linked to the sensor (ECAM system memory, etc.). The acquisition element ACQ has access to this memory and acquires this operating information.

If no failure has been detected or if a detected failure does not prevent the execution of one or more tests to be executed, the set of tests to be executed is validated and communicated during the selection step E4.

If a detected failure or a specific configuration of the system prevents the execution of one or more tests of the set of tests to be executed, the operating information relating to the failure or to the configuration is error information.

In the case of error information, the adjustment step E5 then comprises the determination E52, display E53 and decision E54 sub-steps.

During the determination sub-step E52, one or more replacement tests are determined, from the executable tests of the list of executable tests, in order to replace the test or tests of the set of tests to be executed which are not able to be executed. The determination of the replacement test or tests takes into account the correspondence between the execution conditions of the test or tests which are not able to be executed and error information transmitted by the acquisition element ACQ. The replacement test or tests are communicated to the display module DISP1 which displays them during a display sub-step E53.

The operator O then decides, during a decision sub-step E54, either to validate the replacement test or tests or to cancel the replacement test or tests. The decision to validate or cancel the replacement test or tests is implemented by a decision element DEC2, for example a touchscreen of a mobile tablet.

If the operator O decides to cancel the replacement test or tests, cancellation information AT is communicated by the decision element DEC2 to the selection module SEL. The selection step E4 then consists in or comprises removing the test or tests which cannot be executed from the set of tests to be executed and communicates this set of tests to be executed.

If the operator O decides to validate the replacement test or tests, validation information VT is communicated by the decision element DEC2 to the selection module SEL. The selection step E4 then consists in or comprises replacing the test or tests which cannot be executed with the replacement test or tests in the set of tests to be executed. This new set of tests to be executed is then communicated to the optimization module OPT.

During an optimization step E6, the set of tests to be executed is optimized. The optimized set of tests to be executed forms a sequence of tests which comprises a plurality of series of tests including at least one test of the set of tests to be executed. The optimization of the set of tests forming the plurality of series of tests is performed according to the prerequisites and the attributes of each of the tests of the set of tests to be executed. The optimization is based on a search for parallelization of the series of tests having attributes and prerequisites allowing this. The optimization module OPT then communicates the sequence of tests.

During a display step E7, the sequence of tests that is transmitted by the optimization module is displayed on the display module DISP2. The operator O decides, during a decision successive step E8, either to validate the sequence of tests or to cancel the sequence of tests.

If the decision of the operator O is to cancel the sequence of tests, the decision module DEC1 generates a signal AS. No test is carried out.

If the decision of the operator O is to validate the sequence of tests, the decision module DEC1 generates a signal VT and the sequence of tests is communicated to the control module CONT.

During a command step E9, the execution of the tests forming the sequence of tests by each system is commanded. Orders for executing tests are communicated to each of the systems associated with the tests that they execute. Several systems can perform tests simultaneously. During the execution of tests, the control module CONT generates results representing the execution of the tests of the systems.

While the tests of the sequence of tests are executed without errors, the results of the execution of the sequence of tests transmitted by the control module CONT are displayed gradually on the display module DISP3, during a display step E10. They are viewed by the operator O, located on the ground, who ensures that the tests of the systems take place correctly. Simultaneously, the results of the execution of the sequence of tests are recorded, during a recording step E11, in a database of results. This database of results is arranged in the same central unit as the test database DATA1.

By contrast, if the execution of one or more tests of the sequence of tests generates results comprising errors, an alert step E12 is implemented by an alert module ALERT. One or more test execution results comprising errors signifies that the remainder of the sequence of tests cannot be executed. This corresponds to a particular situation PS. By way of example, a first test of the sequence of tests can require a second test of the sequence of tests to be executed beforehand. This prerequisite is one of the execution conditions of the first test of the sequence of tests. If the results of the prior execution of this second test show errors of the tested system, then the first test cannot be executed. During the alert step E12, the alert module ALERT commands the stoppage of the execution of the remainder of the sequence of tests by each of the systems and transmits alert information associated with the particular situation PS.

This alert information is received by an adjustment module ADJ2 of the optimization module OPT. This adjustment module ADJ2 determines a new optimized sequence of tests, during an adjustment step E13. The new sequence of tests is optimized according to the tests that remain to be executed, to the execution conditions thereof and to the alert information transmitted by the alert element. The new sequence of tests is communicated directly by the adjustment module ADJ2 to the control module CONT which commands the execution by the systems of the new sequence of tests.

The results of the execution of the new sequence of tests are displayed on the display module DISP3 during the display step E10. They are also recorded gradually during a recording step E11 in the recording module REC.

The alert E12 and adjustment E13 steps of the sequence of tests are repeated each time that a particular situation PS is encountered, until the entire sequence of tests is executed.

Advantageously, the device 1 makes it possible to execute tests chosen according to the current state of the aircraft AC and the previous uses of the systems.

Moreover, the device 1 makes it possible, according to the test or tests, for one or more operators to refrain from monitoring the execution. Indeed, in the case of failures that have been encountered and that can affect the remainder of the sequence of tests, the device 1 optimizes a new sequence autonomously, without intervention by one or more operators.

Furthermore, the device 1 allows a parallelization of certain tests taking into account interactions between the systems.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for optimizing tests of systems of an aircraft, the method comprising:
 a first display step, implemented by a first display module, comprising displaying, for an operator, a list of executable tests that can be executed by at least one of the systems, each of the executable tests being associated with execution conditions;
 a selection step, implemented by a selection module, comprising selecting and communicating, from the list of executable tests, a set of tests for execution, the set of tests comprising at least one executable test;
 an optimization step, implemented by an optimization module, comprising determining and communicating, depending on the execution conditions, a sequence of tests that represents an optimized execution of the set of tests, the sequence of tests comprising a plurality of series of tests that are executable in parallel, wherein each of the series of tests comprises at least one test from the set of tests;
 a second display step, implemented by a second display module, comprising displaying, to the operator, the sequence of tests;
 a decision step, implemented by a decision module, comprising generating a signal corresponding either to a first signal representing a decision of the operator to validate the sequence of tests, or to a second signal representing a decision of the operator to cancel the sequence of tests;
 when the signal generated by the decision module corresponds to the first signal, at least one command step, implemented by a control module, comprising commanding execution of the sequence of tests by the systems and generating results of the execution of the sequence of tests by each of the systems; and
 a first adjustment step, implemented by a first adjustment module, the first adjustment step being implemented before the optimization step and comprising:
  an acquisition sub-step, implemented by an acquisition element, comprising acquiring operating information of the systems during previous uses; and
  when the operating information comprises error information relating to operating errors of the systems preventing execution of at least one part of the set of tests, performing:
   a determination sub-step, implemented by a determination element, comprising:
    determining at least one replacement test for execution, the at least one replacement test being selected from the list of executable tests; and
    communicating the at least one replacement test;
   a display sub-step, implemented by the first display module, comprising displaying, to the operator, the at least one replacement test; and
   a decision sub-step, implemented by a decision element, comprising:
    allowing the operator to validate inclusion of the at least one replacement test in the set of tests or to cancel the at least one replacement test from the set of tests; and
    communicating to the selection module:
     validation information for validating the inclusion of the at least one replacement test in the set of tests; or
     cancellation information for cancelling the at least one replacement test from the set of tests.

2. The method according to claim 1, comprising, implemented before the first display step:
 an identification step, implemented by an identification module, comprising communicating identification information for identifying a set of specific systems to a general database, the identification information being provided by an operator; and
 a preselection step, implemented by a preselection module, comprising preselecting, from a plurality of test databases contained in the general database, a test database associated with the identification information communicated by the identification module, the preselected test database comprising the list of executable tests.

3. The method according to claim 1, wherein the selection step comprises:

replacing, in the set of tests, the at least one part of the set of tests that cannot be executed with the at least one replacement test when the validation information is received; or removing, from the set of tests, the at least one part of the set of tests that cannot be executed when the cancellation information is received.

4. The method according to claim 1, comprising, implemented after the command step:

a third display step, implemented by a third display module, comprising displaying at least some of the results of the execution of the sequence of tests; and a recording step, implemented by a recording module, comprising recording the results of the execution of the sequence of tests, which are transmitted by the control module, in a database of results.

5. The method according to claim 1, comprising, when a result of the execution of a test prevents execution of a remainder of the sequence of tests representing a particular situation an alert step, implemented by an alert element, comprising commanding stoppage of the execution of the sequence of tests by each of the systems and transmitting alert information.

6. The method according to claim 5, comprising a second adjustment step, implemented by a second adjustment module, comprising, upon receipt of the alert information from the alert element, determining a new sequence of tests according to the execution conditions and the alert information received from the alert element.

7. A device for optimizing tests of systems of an aircraft, the device comprising:

a test database containing a list of executable tests that can be executed by at least one of the systems, each of the executable tests being associated with execution conditions;

a first display module configured to display, for an operator, the list of executable tests;

a selection module configured to select and to communicate, from the list of executable tests, a set of tests for execution, the set of tests comprising at least one executable test;

an optimization module, configured to determine and to communicate, depending on the execution conditions, a sequence of tests that represents an optimized execution of the set of tests, the sequence of tests comprising a plurality of series of tests that are executable in parallel, wherein each of the series of tests comprises at least one test from the set of tests;

a second display module configured to display, for the operator, the sequence of tests;

a decision module configured to generate a signal corresponding either to a first signal representing a decision of the operator to validate the sequence of tests, or a second signal representing a decision of the operator to cancel the sequence of tests;

a control module configured, when the signal generated by the decision module corresponds to the first signal, to command execution of the sequence of tests by each of the systems that are associated therewith and to generate results of the execution of the sequence of tests by each of the systems; and a first adjustment module comprising:

an acquisition element configured to acquire operating information of the systems during previous uses;

a determination element configured to, when the operating information comprises error information relating to operating errors of the systems preventing execution of at least one part of the set of tests:

determine at least one replacement test for execution, the at least one replacement test being selected from the list of executable tests; and communicate the at least one replacement test; and a decision element;

wherein the first display module is configured to display the at least one replacement test to the operator; and wherein the decision element is configured to:

allow the operator to validate inclusion of the at least one replacement test in the set of tests or to cancel the at least one replacement test from the set of tests; and communicate to the selection module:

validation information for validating the inclusion of the at least one replacement test in the set of tests; or cancellation information for cancelling the at least one replacement test from the set of tests.

8. The device according to claim 7, comprising:

a general database containing a plurality of test databases;

an identification module configured to communicate to the general database identification information for identifying a specific set of systems, the identification information being provided by the operator; and a preselection module configured to preselect, from the plurality of test databases contained in the general database, a test database associated with the identification information communicated by the identification module, the preselected test database comprising the list of executable tests.

9. The device according to claim 7, wherein the selection module is configured to:

replace, in the set of tests, the at least one part of the set of tests that cannot be executed with the at least one replacement test when the validation information is received; or remove, from the set of tests, the at least one part of the set of tests that cannot be executed when the cancellation information is received.

10. The device according to claim 7, comprising a recording module configured to record the results of the execution of the tests, which are transmitted by the control module, in a database of results.

11. The device according to claim 10, comprising a third display module configured to display at least some of the results of the execution of the sequence of tests.

12. The device according to claim 7, wherein the control module includes an alert element, which is configured to, when a result of the execution of a test prevents execution of a remainder of the sequence of tests representing a particular situation, command stoppage of execution of the sequence of tests by each of the systems and to transmit alert information representing a particular situation.

13. The device according to claim 12, wherein the optimization module includes a second adjustment module configured to, upon receipt of the alert information from the alert element, determine a new sequence of tests depending on the execution conditions and the alert information.

14. An aircraft comprising:

a device for optimizing tests of systems of an aircraft, the device comprising:

a test database containing a list of executable tests that can be executed by at least one of the systems, each of the executable tests being associated with execution conditions;

a first display module configured to display, for an operator, the list of executable tests;

a selection module configured to select and to communicate, from the list of executable tests, a set of tests for execution, the set of tests comprising at least one executable test;

an optimization module, configured to determine and to communicate, depending on the execution conditions, a sequence of tests that represents an optimized execution of the set of tests, the sequence of tests comprising a plurality of series of tests that are executable in parallel, wherein each of the series of tests comprises at least one test from the set of tests;

a second display module configured to display, for the operator, the sequence of tests;

a decision module configured to generate a signal corresponding either to a first signal representing a decision of the operator to validate the sequence of tests, or a second signal representing a decision of the operator to cancel the sequence of tests;

a control module configured, when the signal generated by the decision module corresponds to the first signal, to command execution of the sequence of tests by each of the systems that are associated therewith and to generate results of the execution of the sequence of tests by each of the systems; and a first adjustment module comprising:
an acquisition element configured to acquire operating information of the systems during previous uses;
a determination element configured to, when the operating information comprises error information relating to operating errors of the systems preventing execution of at least one part of the set of tests:
determine at least one replacement test for execution, the at least one replacement test being selected from the list of executable tests; and
communicate the at least one replacement test; and
a decision element;
wherein the first display module is configured to display the at least one replacement test to the operator; and
wherein the decision element is configured to:
allow the operator to validate inclusion of the at least one replacement test in the set of tests or to cancel the at least one replacement test from the set of tests; and
communicate to the selection module:
validation information for validating the inclusion of the at least one replacement test in the set of tests; or
cancellation information for cancelling the at least one replacement test from the set of tests.

15. The aircraft according to claim 14, wherein the device comprises:
a general database containing a plurality of test databases;
an identification module configured to communicate to the general database identification information for identifying a specific set of systems, the identification information being provided by the operator; and
a preselection module configured to preselect, from the plurality of test databases contained in the general database, a test database associated with the identification information communicated by the identification module, the preselected test database comprising the list of executable tests.

16. The aircraft according to claim 14, wherein the selection module is configured to:
replace, in the set of tests, the at least one part of the set of tests that cannot be executed with the at least one replacement test when the validation information is received; or
remove, from the set of tests, the at least one part of the set of tests that cannot be executed when the cancellation information is received.

17. The aircraft according to claim 14, wherein the device comprises a recording module configured to record the results of the execution of the tests, which are transmitted by the control module, in a database of results.

18. The aircraft according to claim 17, wherein the devices comprises a third display module configured to display at least some of the results of the execution of the sequence of tests.

19. The aircraft according to claim 14, wherein the control module includes an alert element, which is configured to, when a result of the execution of a test prevents execution of a remainder of the sequence of tests representing a particular situation, command stoppage of execution of the sequence of tests by each of the systems and to transmit alert information representing a particular situation.

20. The aircraft according to claim 19, wherein the optimization module includes a second adjustment module configured to, upon receipt of the alert information from the alert element, determine a new sequence of tests depending on the execution conditions and the alert information.

* * * * *